US008110052B2

(12) United States Patent
Olsen et al.

(10) Patent No.: US 8,110,052 B2
(45) Date of Patent: Feb. 7, 2012

(54) SYSTEMS AND METHODS FOR SORTING IN A PACKAGE DELIVERY SYSTEM

(75) Inventors: John Olsen, Cumming, GA (US); David Bradley, Alpharetta, GA (US); Rhesa Jenkins, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 12/144,371

(22) Filed: Jun. 23, 2008

(65) Prior Publication Data

US 2008/0264834 A1 Oct. 30, 2008

Related U.S. Application Data

(62) Division of application No. 10/847,184, filed on May 17, 2004, now abandoned.

(51) Int. Cl.
*B32B 41/00* (2006.01)

(52) U.S. Cl. .......................................... 156/64; 156/366

(58) Field of Classification Search .................... 156/64, 156/367, 368; 209/3.1, 3.2, 3.3; 700/225, 700/226, 227; 705/22, 28
See application file for complete search history.

(56) References Cited

U.S. PATENT DOCUMENTS

| | | | | |
|---|---|---|---|---|
| 4,832,204 | A | 5/1989 | Handy et al. | |
| 5,472,097 | A | 12/1995 | Villachica | |
| 5,778,377 | A | 7/1998 | Marlin et al. | |
| 5,869,819 | A | 2/1999 | Knowles et al. | |
| 5,971,587 | A | 10/1999 | Kato et al. | |
| 6,285,916 | B1 | 9/2001 | Kadaba et al. | |
| 6,401,078 | B1 * | 6/2002 | Roberts et al. | 705/28 |
| 7,063,256 | B2 | 6/2006 | Anderson et al. | |
| 7,090,134 | B2 * | 8/2006 | Ramsager | 235/462.13 |
| 2002/0072897 | A1 * | 6/2002 | Skonberg et al. | 704/201 |
| 2002/0135802 | A1 | 9/2002 | Perez et al. | |
| 2002/0172399 | A1 | 11/2002 | Poulin et al. | |
| 2004/0004119 | A1 | 1/2004 | Baldassari et al. | |
| 2004/0074977 | A1 * | 4/2004 | Rainey et al. | 235/494 |
| 2004/0182925 | A1 * | 9/2004 | Anderson et al. | 235/385 |

OTHER PUBLICATIONS

Accenture. Radio Frequency Identification White Paper [Online], Nov. 16, 2001 [retrieved on Nov. 11, 2002]. Retrieved from the Internet: <URL: http://www.accenture.com/xdoc/en/services/technology/vision/RFIDWhitePaperNov01.pdf>.

Ups Pressroom, UPS Suite of New Technology Promises Better Customer Service, Operating Effciency, Sep. 23, 2003. Retrieved from the Internet: <URL: http://www.pressroom.ups/com/pressreleases/archives/archive/0.1363.4337.00.html.

UPS Pressroom, UPS Unveils State-of-the-Art Package Hub in Maple Grove, Minnesota, Nov. 12, 2002. Retrieved from the Internet: <URL: http://www.pressroom.ups.com/pressreleases/archives/archive/0.1363.4216.00.html.

International Search Report dated Aug. 5, 2005, PCT Application No. PCT/US2005/016857, filed May 13, 2005.

* cited by examiner

*Primary Examiner* — George Koch
(74) *Attorney, Agent, or Firm* — Alston & Bird LLP

(57) ABSTRACT

The present invention provides novel systems and methods for processing packages through a delivery network using a hub assist label. Generally described, the hub assist label includes indicia of a sequence of sorting locations that designates the flow of a package through a delivery network.

6 Claims, 12 Drawing Sheets

SYSTEMS AND METHODS FOR SORTING IN A PACKAGE DELIVERY SYSTEM

CROSS-REFERENCE TO RELATED APPLICATIONS

This application is a divisional of U.S. application Ser. No. 10/847,184, filed May 17, 2004 now abandoned, which is hereby incorporated herein in its entirety by reference.

FIELD OF THE INVENTION

The present invention relates generally to the delivery of packages through a delivery network. More specifically, this invention relates to systems and methods for improving the flow of packages though a package carrier's sorting process using a hub assist label.

BACKGROUND OF THE INVENTION

The delivery of a package from a consignor to a consignee typically requires sorting the package at several locations before the package reaches the final destination. A conventional delivery network typically includes a series of customer service centers that receive and deliver packages, and several intermediate hubs that provide links between the service centers. The flow of a package through this delivery network typically begins at a service center. From there, the package flows through a series of intermediate hubs before reaching the destination facility responsible for delivering the package to the destination address. Within each intermediate hub, the package is sorted according to the destination address for the package and consolidated for transport to the next intermediate hub or service center in the delivery process.

The tremendous volume of packages flowing through the intermediate hubs creates a logistical challenge. To date, sorting at the intermediate hubs is a highly manual process that relies heavily on the knowledge-base of the sorting operator. The sorting operator reads the destination address zip code from a shipping label on a package and sorts the package to the appropriate conveyor belt, bin, or chute. The appropriate sorting location for each zip code is specified in standard sorting charts. Sorting charts are well known in the art and specify the next sorting facility in the delivery chain based on the destination zip code and the service level of the package, wherein the service level of a package represents the committed delivery time for the package. The efficiency of the sorting operation depends on how quickly the sorting operator determines the appropriate sorting location for a package. To improve the efficiency, sorting operators memorize the zip codes associated with each sorting location and use the sorting charts sparingly. This highly manual process often results in sorting errors.

Due to the reliance on a knowledge-based sorting process, changing a sort plan may create signification inefficiencies and increase the opportunity for sorting mistakes. Accordingly, a proposed sorting chart change is weighed against the confusion caused by the change. As a result, many timesaving adjustments to sorting charts are discarded due to the learning curve necessary to implement the change.

In addition, sometimes it is necessary to know the path a package has taken through a delivery network. This may arise in a mistake-tracking context where a carrier desires to monitor sorting mistakes from their sorting hubs or it may be valuable if packages from a particular sorting location become contaminated. The current systems known in the art provide sorting charts at each location that specify the next sorting stop. But once a package is sorted and consolidated, the prior sorting locations for a particular package often cannot be readily determined.

Therefore an unsatisfied need exists for improved systems and methods for sorting packages within a delivery network that overcome the deficiencies in the prior art, some of which are discussed above.

BRIEF SUMMARY OF THE INVENTION

The present invention provides novel systems and methods for processing packages through a delivery network using a hub assist label. Generally described, the hub assist label includes indicia of a sequence of sorting locations that designates the flow of a package through a delivery network.

In accordance with an embodiment of the present invention, a package sortation system is described that associates a sort plan to a package in a delivery network. This system includes a data capture device that captures shipping indicia from the package; a hub assist tool that receives the shipping indicia from the data capture device and associates a sort plan to the package based at least in part on the shipping indicia; and a labeling device that generates a sort label for the package based at least in part on the sort plan.

In accordance with another embodiment of the present invention, a sort assist system is described for the delivery of a package via a delivery network to a destination address. This system includes a data capture device configured to capture shipping indicia from the package; a sort plan database having a plurality of sort plans, wherein each of the sort plans designates a route through the delivery network, wherein further the route includes a list of one or more facilities in the delivery network through which the package will pass to reach the destination address; and a hub assist tool configured to receive the shipping indicia from the data capture device and to associate one of the plurality of sort plans to the package based at least in part on the shipping indicia. The system may also include a labeling device configured to receive the associated sort plan and to generate a hub assist label having indicia of the associated sort plan.

In accordance with a further embodiment of the present invention, a package labeling system to aid in shipping a package bound for consignee address via a delivery network having multiple sortation facilities is described. This system includes a means for generating a first label with the consignee address; and a means for generating a second label that lists a sort plan for the package, wherein the sort plan includes a sequence of sortation instructions that directs a movement of the package through one or more of the multiple sortation facilities in the delivery network. The system may also include a means for generating a third label having indicia of a delivery vehicle and a location for placement of the package on the delivery vehicle.

In accordance with an embodiment of the present invention, a method for delivering a package is described that includes the steps of: capturing shipping indicia for the package; querying a sort plan from a sort plan database based at least in part on the shipping indicia, wherein the sort plan includes a sequence of sorting locations; generating a first hub assist label having indicia of the sort plan; associating the sort plan with the package; creating a second sort plan; generating a second hub assist label having indicia of the second sort plan; associating the second sort plan with the package; and sorting the package based at least in part on the indicia on the second hub assist label.

In accordance with another embodiment of the present invention, a method for sorting a package using a hub assist label is described that includes the steps of: providing a hub assist label associated with a package, the hub assist label having indicia of a sequence of sorting locations; capturing the indicia from the hub assist label; and sorting the package based at least in part on the sequence of sorting locations.

In accordance with an embodiment of the present invention, a method for altering a sort plan is described that includes the steps of: capturing a sort plan from a first hub assist label, the sort plan including a sequence of sorting locations; verifying presence of current location in the sort plan; and in response to absence of current location, capturing shipping indicia for the package; querying a second sort plan; and generating a second hub assist label.

In accordance with an embodiment of the present invention, a method for altering a sort plan for a package is described that includes the steps of: capturing a sort plan from a first hub assist label, the sort plan comprising a sequence of sorting locations; capturing shipping indicia from a shipping label associated with the package; generating a second sorting plan based at least in part on the shipping indicia; comparing the first sort plan with the second sort plan; and in response to a discrepancy, generating a second hub assist label having indicia of the second sort plan.

BRIEF DESCRIPTION OF THE SEVERAL VIEWS OF THE DRAWINGS

Figure 1:
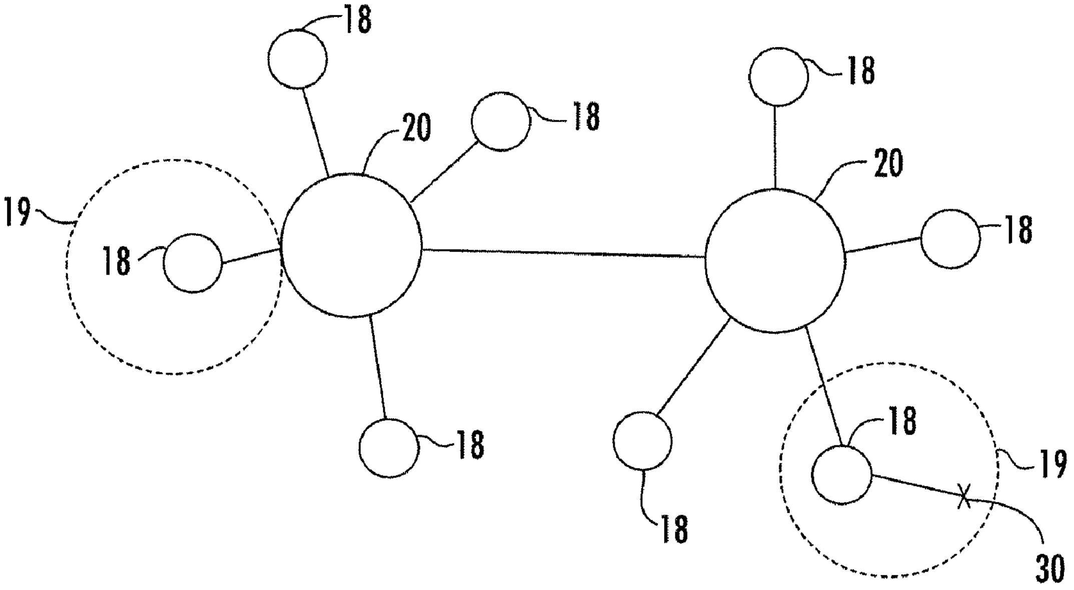

Having thus described the invention in general terms, reference will now be made to the accompanying drawings, which are not necessarily drawn to scale, and wherein:

FIG. 1 illustrates a delivery network in accordance with an embodiment of the present invention.

Figure 2:
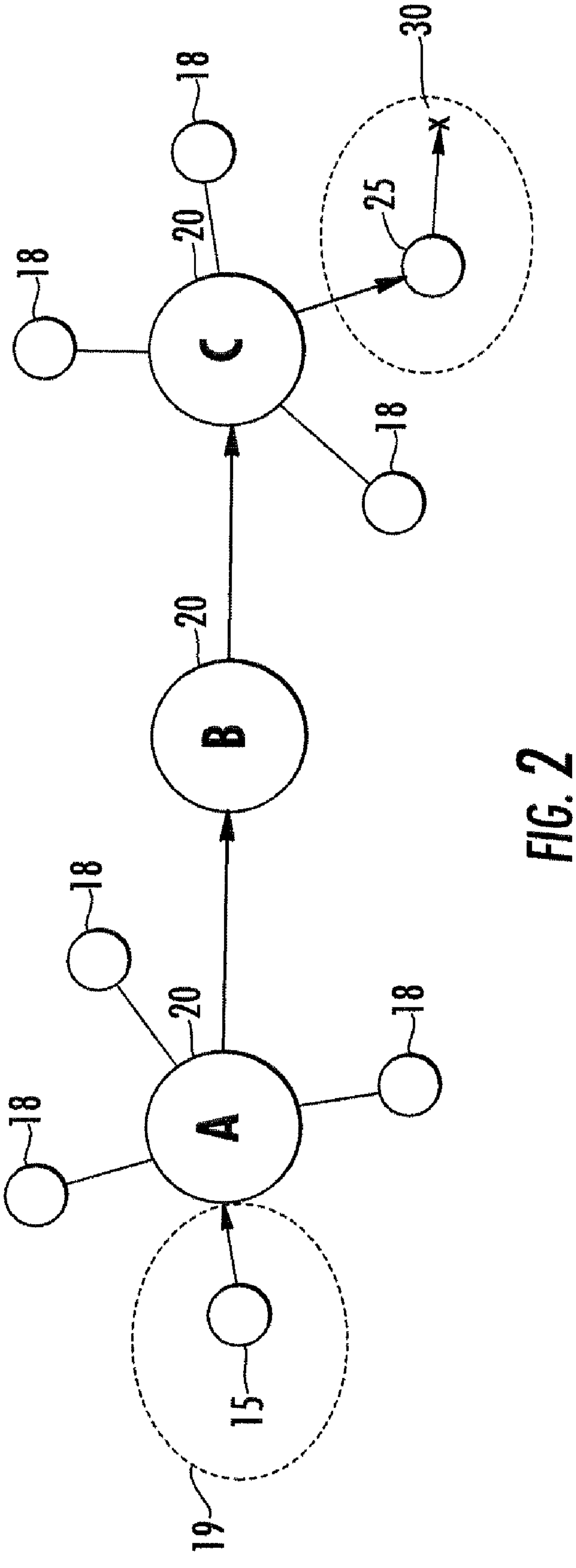

FIG. 2 illustrates the flow of a package through a delivery network in accordance with an embodiment of the present invention.

Figure 3:
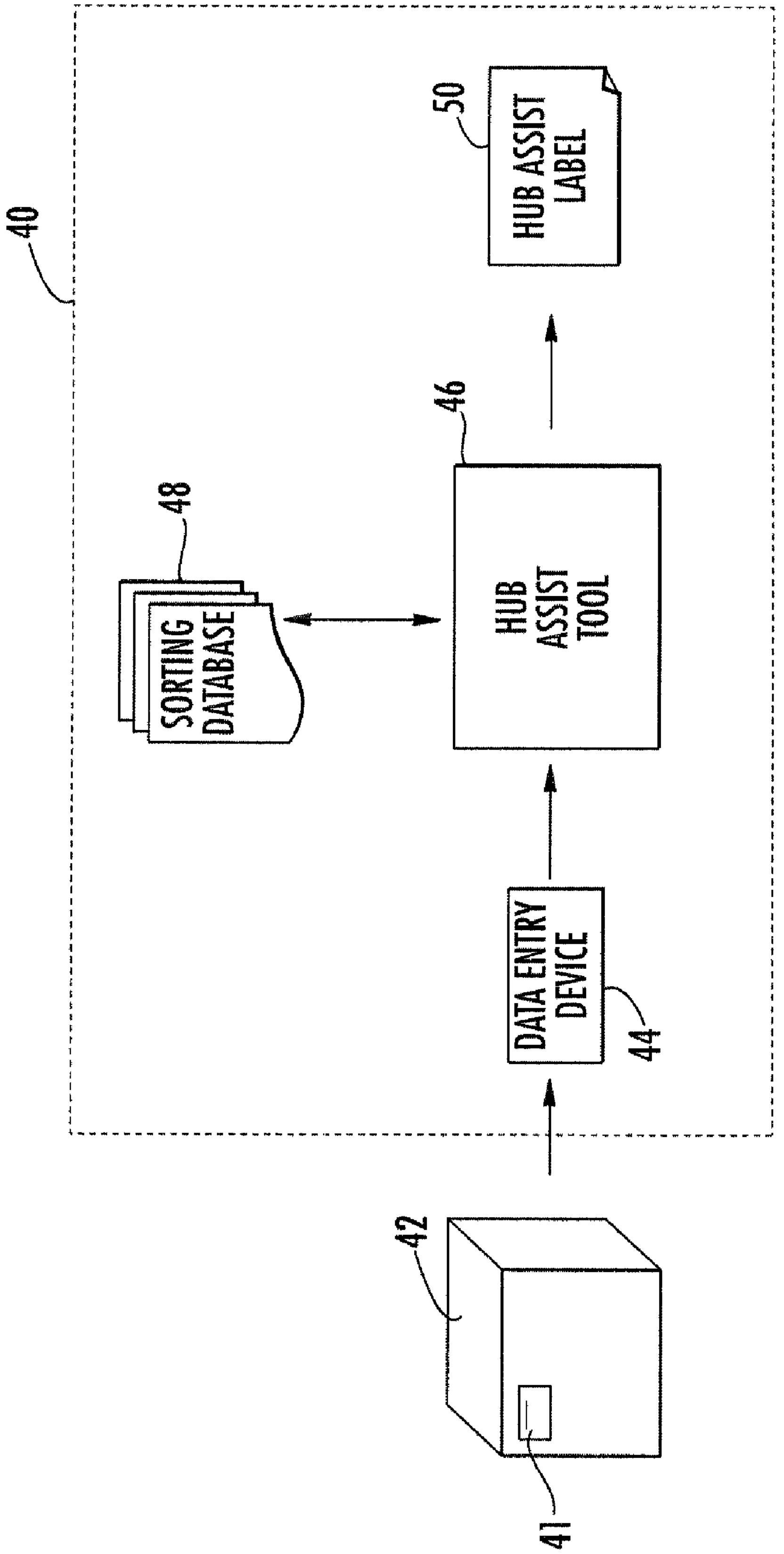

FIG. 3 illustrates a sort assist system in accordance with an embodiment of the present invention.

Figure 4:
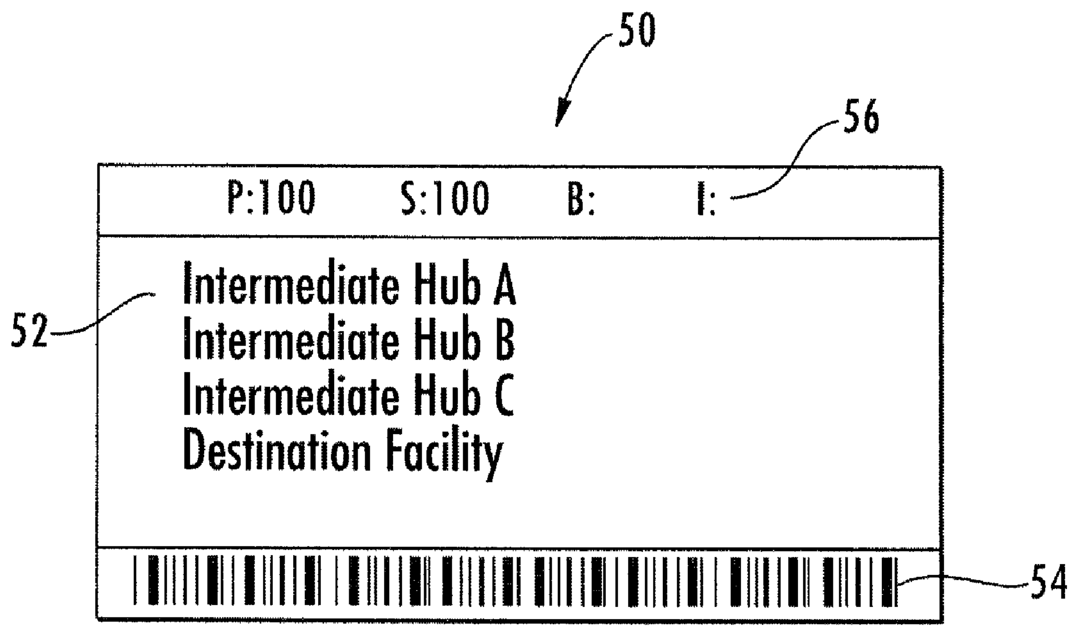

FIG. 4 illustrates a hub assist label containing indicia of a sorting process in accordance with an embodiment of the present invention.

Figure 5:
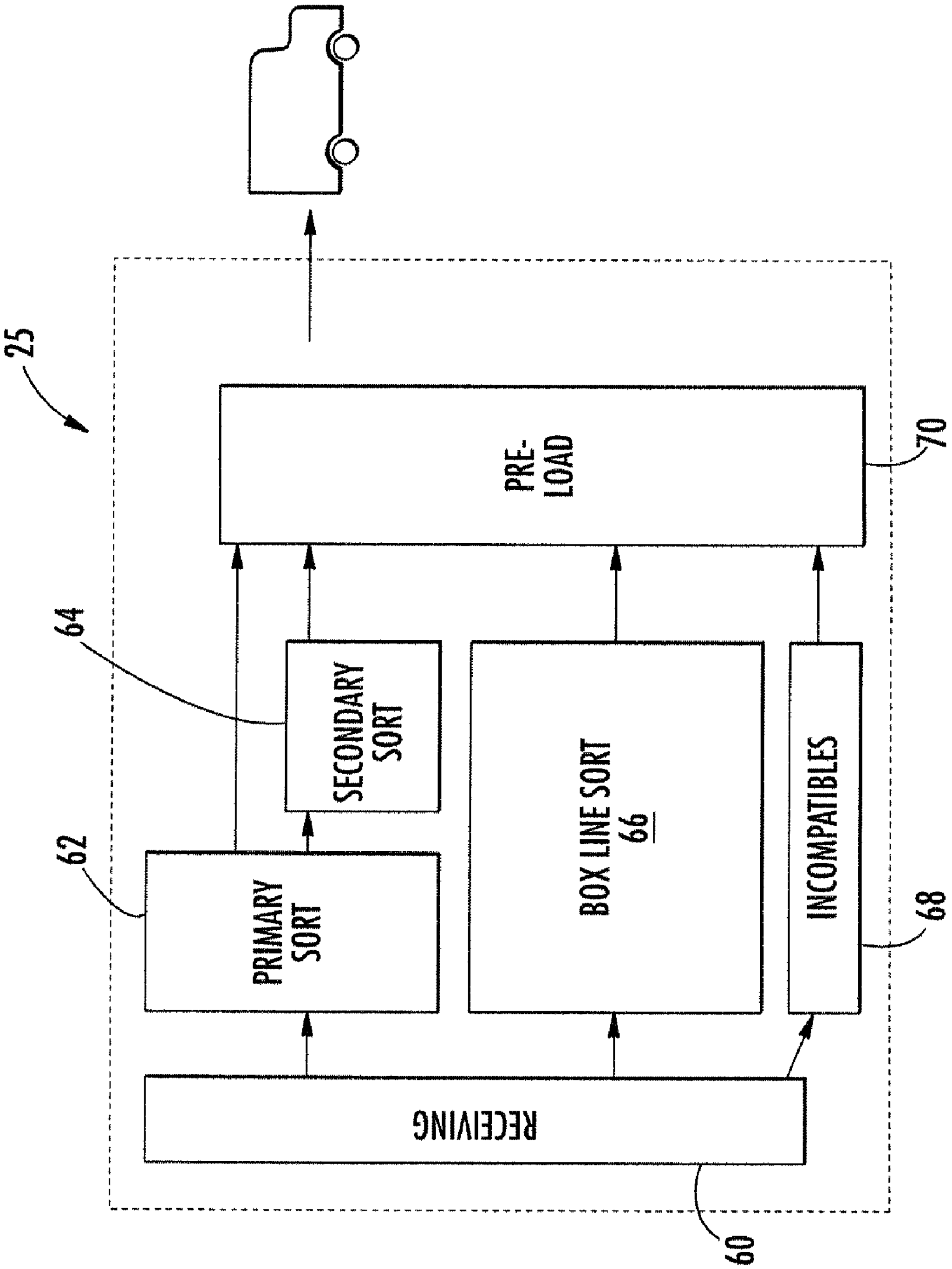

FIG. 5 illustrates a destination facility configured in accordance with an embodiment of the present invention.

Figure 6:
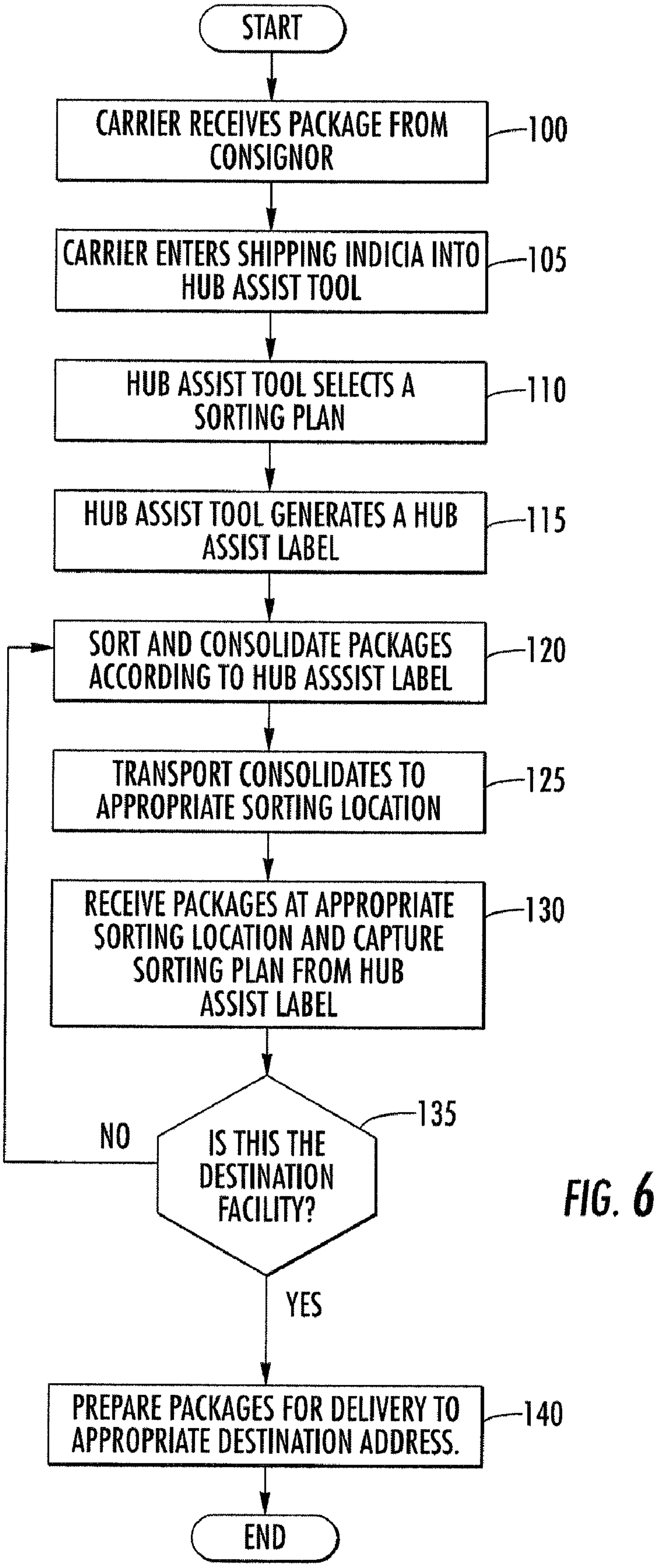

FIG. 6 is a process flow diagram that illustrates the steps for using a hub assist label in accordance with an embodiment of the present invention.

Figure 7:
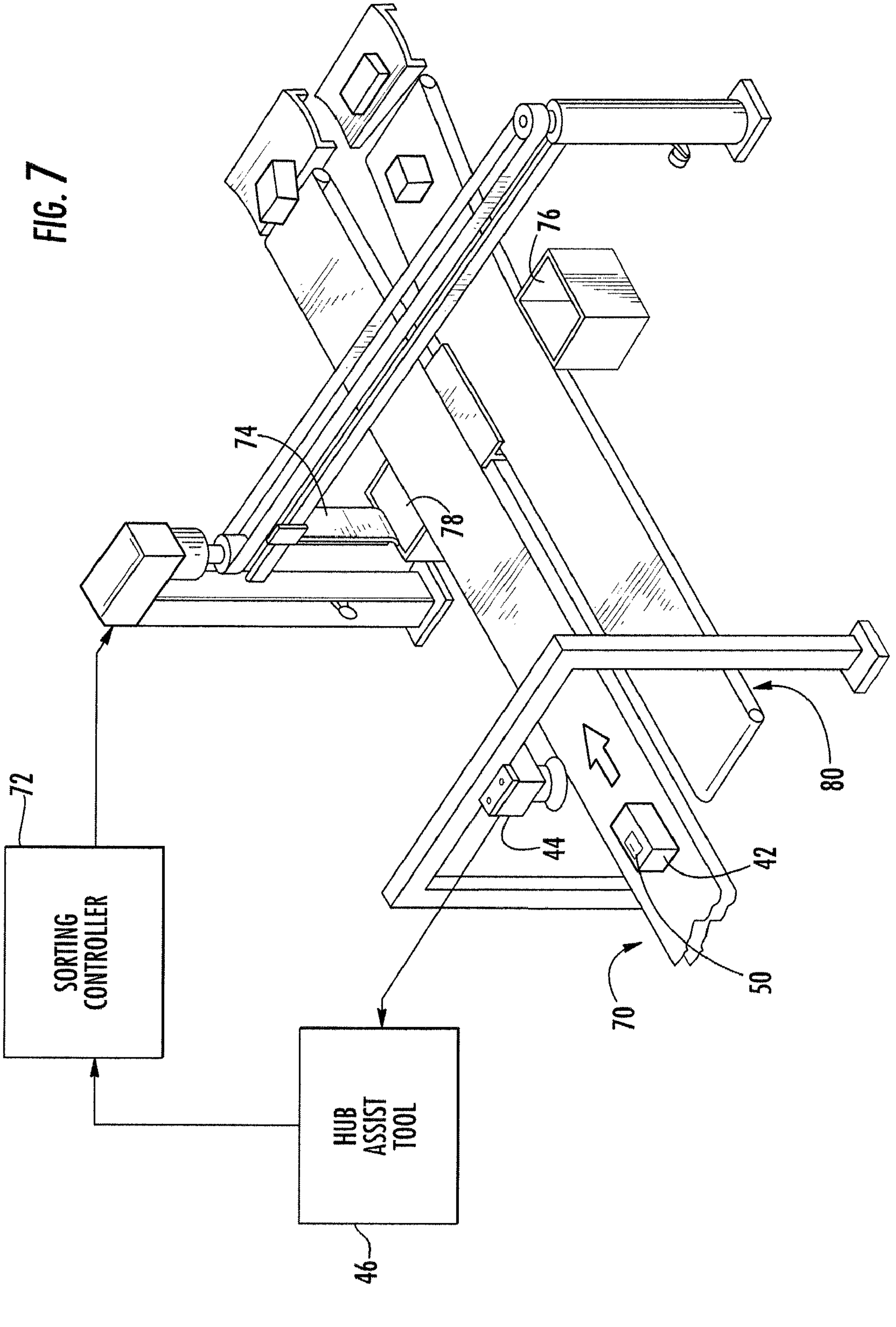

FIG. 7 illustrates an automated sortation system in accordance with an embodiment of the present invention.

Figure 8:
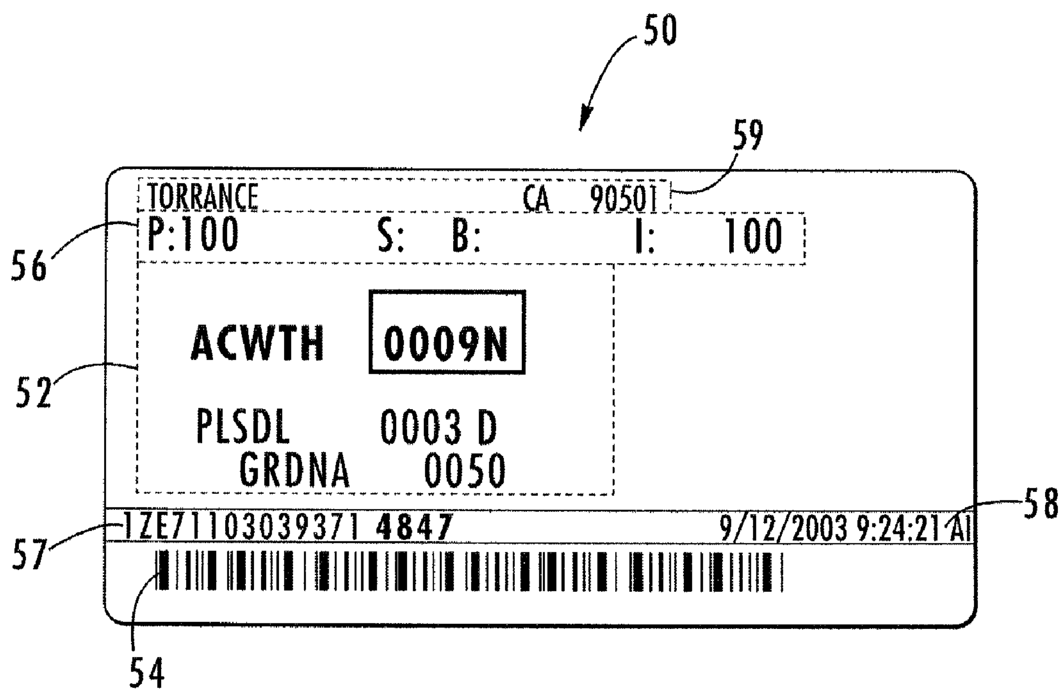

FIG. 8. illustrates an exemplary hub assist label in accordance with an embodiment of the present invention.

Figure 9:
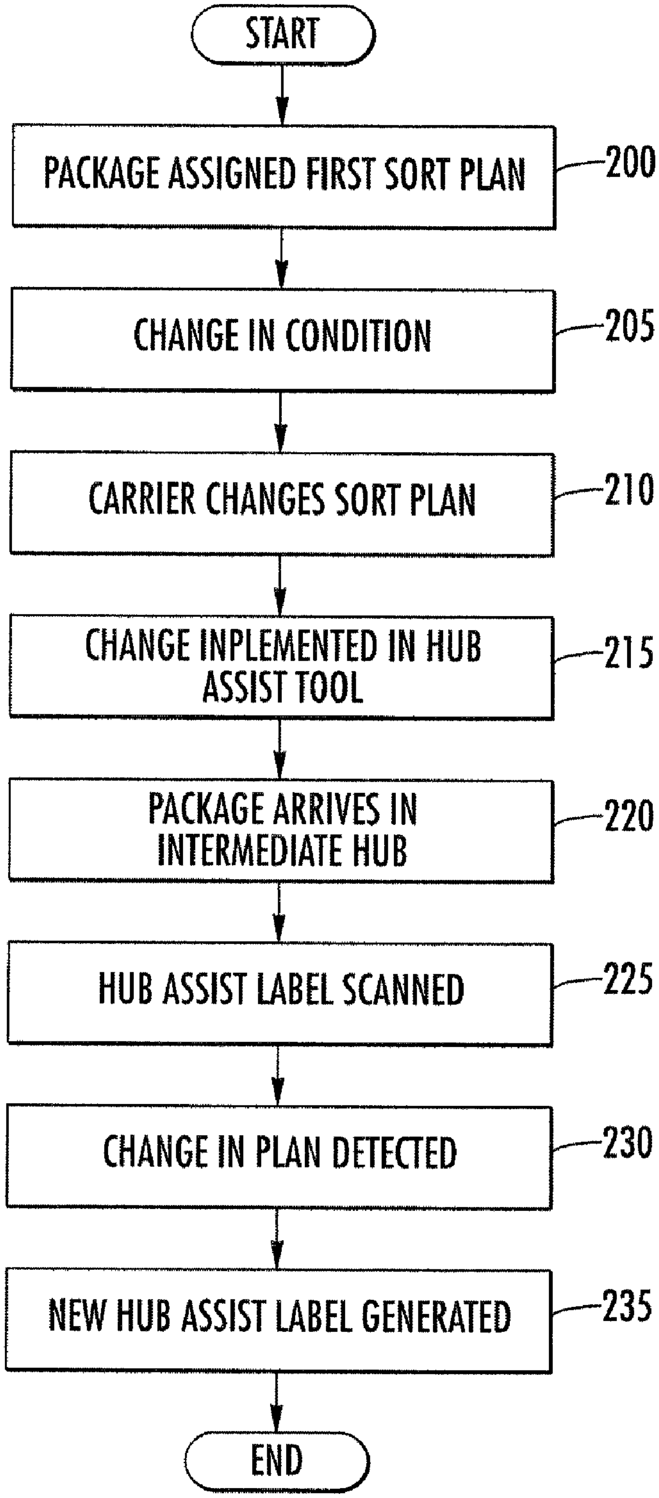

FIG. 9 is a process flow diagram that illustrates the steps for altering a sort plan using a hub assist label in accordance with an embodiment of the present invention.

Figure 10:
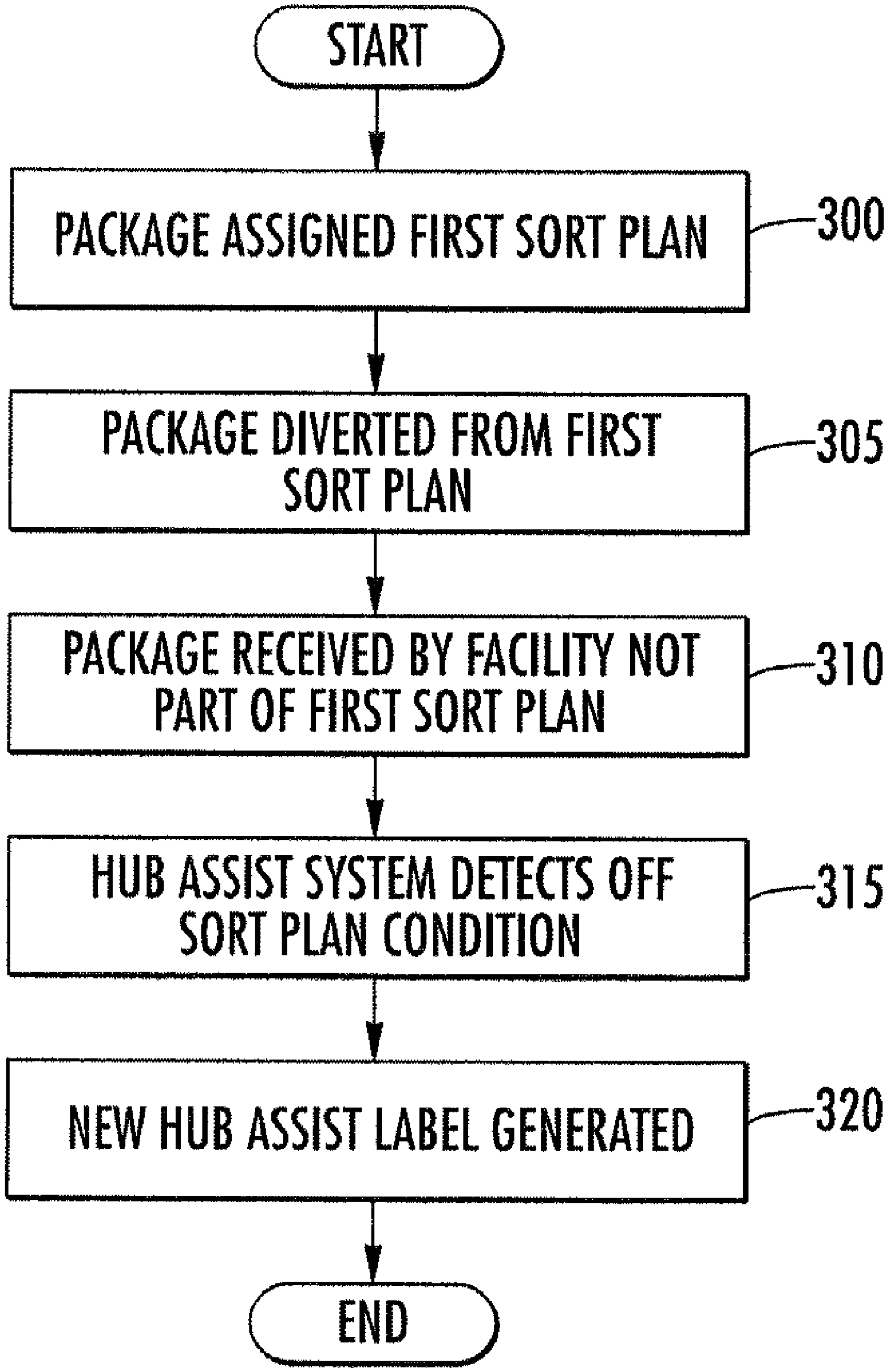

FIG. 10 is a process flow diagram that illustrates the steps for detecting the diversion of a package from a sort plan in accordance with an embodiment of the present invention.

Figure 11:
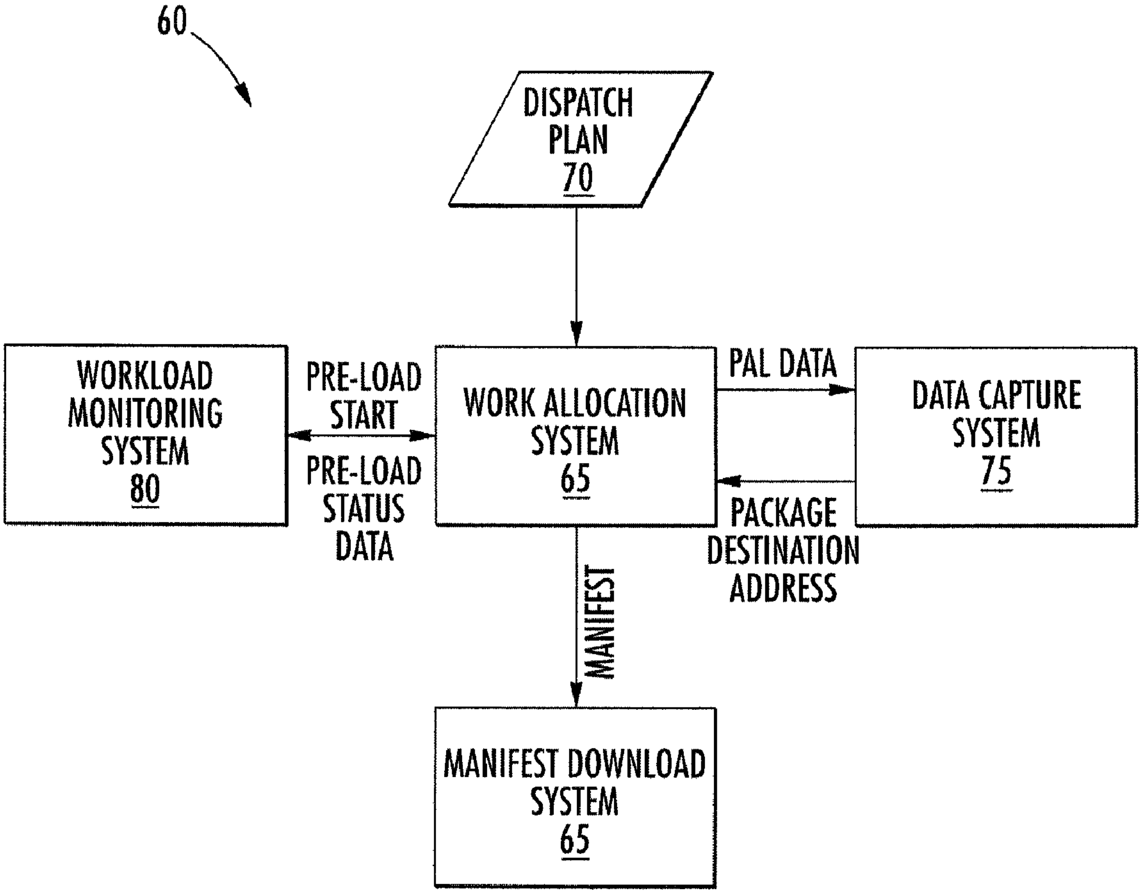

FIG. 11 illustrates a delivery system in accordance with an embodiment of the present invention.

Figure 12:
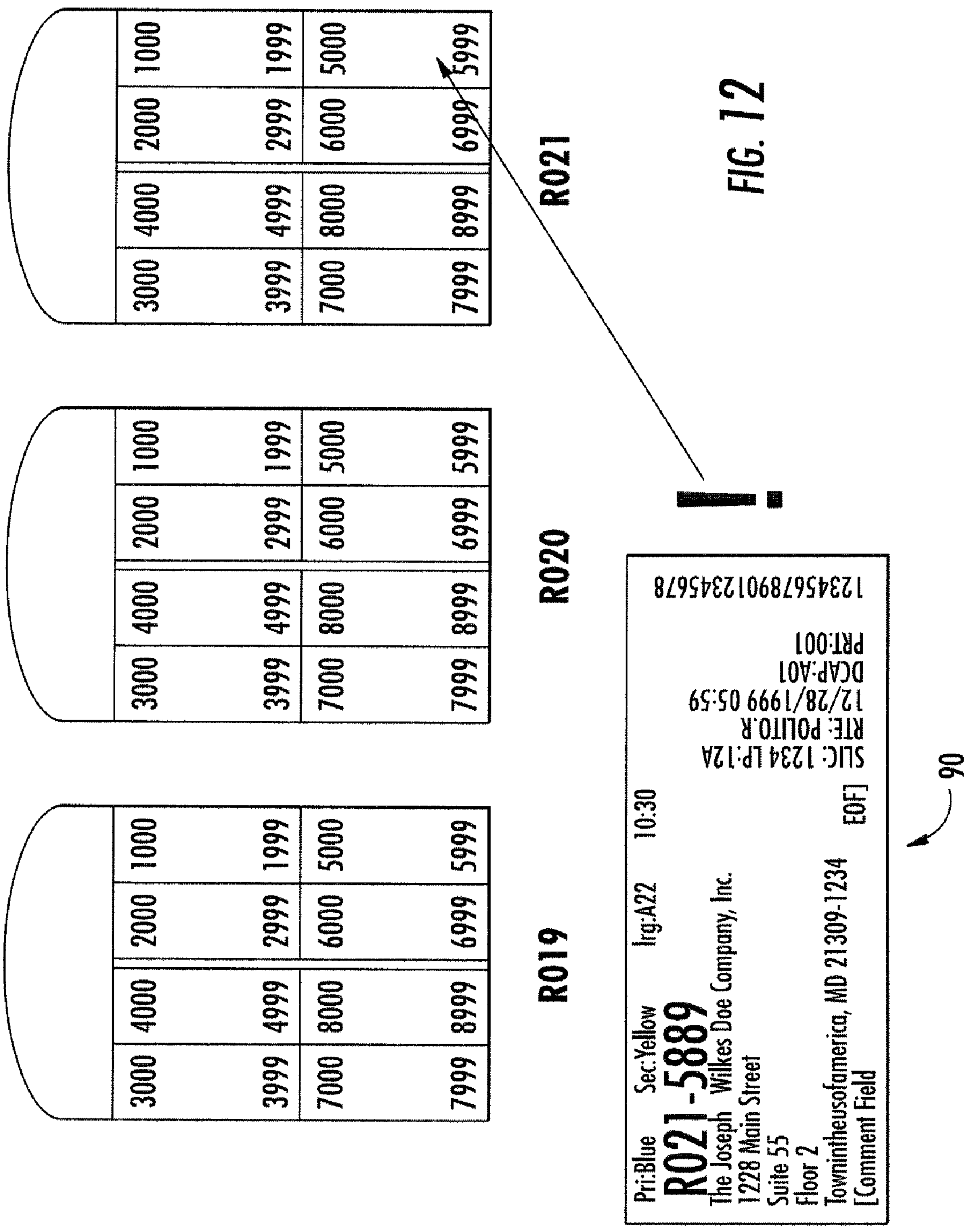

FIG. 12 shows a pre-load assist label (PAL) that contains a package handling instruction in accordance with an embodiment of the present invention.

DETAILED DESCRIPTION OF THE INVENTION

The present invention will now be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The present invention provides novel systems and methods for processing packages through a delivery network using a hub assist label. Generally described, the hub assist label provides indicia of a sort plan that designates the flow of a package through a delivery network. Sorting operators use the hub assist label to identify the next sorting location in the delivery sequence.

Delivery Network

A delivery network 10 comprises a plurality of sorting locations linked by transport and arranged in a hub and spoke configuration as illustrated in FIG. 1. Preferably, the sorting locations are divided into two broad categories: service centers 18 and intermediate sorting hubs 20. In a preferred embodiment, service centers 18 have responsibility for the delivery and pickup of packages within a designated geographic area 19. Service centers 18 may also receive packages directly from consignors. If the destination address 30 of a package picked up or received from a consignor is outside the designated delivery area 19 for that service center 18, the package is sorted at the receiving service center 18 and consolidated for transport to an intermediate sorting hub 20.

An exemplary package flow in accordance with an embodiment of the present invention is illustrated in FIG. 2. In this embodiment, the package flows from an origin facility 15 to a destination facility 25 via a series of intermediate sorting hubs 20. As used herein, the origin facility 15 is the first facility to receive a package. The package may be received directly from a consignor, or the package may be received from a delivery vehicle that has picked up the package from a consignor's home or business. The origin facility 15 is preferably a service center 18; however, in an alternative embodiment, an intermediate sorting hub 20 or another carrier facility can serve as an origin facility 15 and may be the first facility in the delivery network 10 to receive a package.

As used herein, a destination facility 25 is the last carrier facility to handle the package before the package is picked up by the consignee or delivered to the consignee by a delivery vehicle. This facility too is preferably a service center 18. But again, an intermediate sorting hub 20 or another carrier facility can serve as a destination facility from which packages are delivered to consignees, or from which packages are held for consignee pickup.

Sort Assist System

In a preferred embodiment of the present invention, a sort assist system 40, as illustrated in FIG. 3, controls the flow of a package 42 through a delivery network 10. In this embodiment, a data capture device 44 captures and communicates the destination zip code and service level for a package 42 to a hub assist tool 46. Alternatively, the data capture device 44 may capture a tracking number or other shipping label indicia from a package and use that to query a database of package data to determine the destination zip code and service level of the package. As will be apparent to one of ordinary skill in the art, any shipping indicia may be used in connection with the present invention.

The data capture device 44 may be a barcode reader, a RFID interrogator or any other type of automated or manual data capture device that is known in the art.

As described in greater detail below, in a preferred embodiment, a hub assist tool 46 queries a sort plan database 48 with a destination zip code and service level that are captured from the package, and this query results in a sort plan for the package 42. But one of ordinary skill will recognize that the sort plan does not have to be determined from the destination zip code and the service level. Thus, for example, a carrier may offer only one service level, in which case, a sort plan can be determined from the destination zip code alone, or alternatively from the destination address alone. As will be apparent, the sort plan can be based on any combination of shipping indicia and the present invention is not dependent on any one approach.

As used herein, the sort plan specifies the route through a delivery network 10 that a package takes as it travels from an origin facility 15 to a destination facility 25. An aspect of the present invention is that the sort plan is displayed in one of several ways to the sorting operators that work in the hubs. By having the sort plan clearly visible and associated with the package, sorting operators can determine at a glance where the package is heading next and how to sort the package.

Sorting charts list the available sort plans in a carrier system. In a preferred embodiment, sorting charts are stored in a database or some other electronic format and are indexed by destination zip code and service level. Again, other package shipping indicia can be used to index the sort plans in alternative embodiments, but for purposes of description, the destination zip code and service level are used herein.

Once the destination zip code and service level have been captured from the package and used to identify a sort plan for the package, the sort plan is sent to a hub assist tool 46, which prints a hub assist label 50. In a preferred embodiment, the hub assist label 50 (sometimes referred to herein as a HAL) describes the sort plan for the package by identifying the sortation facilities through which the package will travel as it moves through the carrier network to the destination facility 25. Because the hub assist label 50 lists every sort location for the package, the sorting operators can readily determine how to handle (i.e., sort) the package without relying on sorting charts or memorized sorting steps. Preferably, a hub assist label 50 is printed at the origin facility 15 when the carrier first receives the package 42. Alternatively, of course, the hub assist label 50 can be printed at subsequent stages in the delivery process.

Printed Hub Assist Label

One format for a hub assist label 50 is illustrated in FIG. 4. In this illustration, a sequential list of sorting locations is provided in human readable form with each sorting location identified by a name or other readily-identifiable numeric or alphanumeric code. The hub assist label 50 also preferably includes indicia 54 in a machine-readable format, such as a barcode, Maxicode, or other machine-readable symbology known in the art. The machine-readable indicia 54 preferably encode the entire sort plan in a machine-readable format. The machine-readable indicia 54 also preferably include a tracking number for the package. In a preferred embodiment, the hub assist label 50 includes both human readable indicia 52 and machine-readable indicia 54 as illustrated in FIG. 4.

The hub assist label 50 also preferably includes indicia of a sorting time at the sorting location in addition to providing the sort plan. It is common in the industry for a sorting facility to receive packages continuously, but sort the packages at predetermined time intervals. For example, an intermediate sorting hub 20 may receive packages throughout the day, but only sort packages in the morning from 6:00 am to 10:00 am and again in the evening from 5:00 pm to 9:00 pm. To designate which sort the package will be processed in, indicia such as, for example an "A" for morning sort and a "P" for night sort may be included on the hub assist label 50.

With reference to FIG. 2, the package flow that corresponds to the hub assist label 50 shown in FIG. 4 will now be described. A package is received at an origin facility 15 for delivery to a destination address 30. Shipping indicia is captured from the package, which, in this example, is the destination zip code and service level of the package. If the destination zip code is outside the delivery area 19 for the origin facility 15, the sort assist system 40 uses the package destination zip code and service level to select a sort plan for the package. In this case, the sort plan indicates that the package will pass through the following carrier facilities on its way to the consignee's destination address: Origin Facility 15, Intermediate Sorting Hub A, Intermediate Sorting Hub B, Intermediate Hub C, Destination Facility 25.

While at the origin facility 15, the sort assist system 40 generates and prints a hub assist label 50 and the HAL is preferably associated with the package, which, in the case of a printed label preferably means that the HAL is affixed to the package. At the origin facility 15, the sorting operator handles the package based on sort instructions shown on the hub assist label 50 and consolidates those packages that are bound for Intermediate Hub A. This step is repeated at Intermediate Hubs B and C and the package is sorted and consolidated based on the sort instructions set out on the hub assist label 50. Finally, at the destination facility 25, the package is again sorted and loaded on a delivery vehicle for delivery to the destination address 30.

In addition to providing sorting instructions for each intermediate sorting location, the hub assist label 50 may include instructions for sorting within a destination facility 25 as illustrated in embodiment shown in FIG. 4. The sorting process in a destination facility 25 comprises segregating the packages in preparation for loading onto delivery vehicles.

A layout of an exemplary destination facility 25 is illustrated in FIG. 5. In a preferred embodiment, packages arriving at a destination facility 25 are segregated into multiple sorting stations within the destination facility 25 based on a number of factors, such as, the package destination address 30 and package dimensions. Packages are received by the destination facility 25 at receiving area 60. From there, the packages are preferably segregated to a primary sorting belt 62, a box line 66 or to an incompatibles area 68. As described below, the sorting stations may be related. Thus, for example, a primary sorting belt may lead to a secondary sorting station 64.

The hub assist label 50 of FIG. 4 contains indicia 56 of the sorting process within the destination facility 25 for an associated package. In this embodiment, the indicia 56 provide a method for designating the different sort stations within the destination facility. The "P", "S", "B" and "I" represent a primary sort belt 62, a secondary sort belt 64, a box line 66 and an incompatibles area 68 respectively. The numbers following the above destinations indicate a particular belt or area to sort the package to. In this embodiment, the operator receiving the packages into the destination facility 25 sorts the package according to the indicia 56 on the hub assist label 50.

This reduces the reliance on an operator's memory (or knowledge-base) to remember the appropriate sorting station for every potential package destination zip code and service level serviced in the carrier facility.

RFID Hub Assist Label

In an alternative embodiment, a hub assist label 50 uses radio frequency identification (RFID) technology. RFID technology differs from barcode scanning in that it uses radio waves rather than optics to capture and transmit data. RFID is known in the art as a form of labeling where electronic labels or tags are programmed with unique information and attached to objects to be identified or tracked. RFID tags use electronic chips to store data that can be broadcast via radio waves to a reader, thereby eliminating the need for a direct line of sight. This feature also makes it possible for tags to be placed anywhere on or in a package. Additional benefits of RFID include greater data storage capacity in comparison to the barcode and the decreased likelihood that the RFID tag will be destroyed or otherwise made unreadable.

A typical RFID system consists of a reader, a tag and a data processing system to process the data read from the tag. The tag also is called a transponder, an expression that is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably. The complexity of the reader (sometimes referred to herein as an interrogator) can vary considerably, depending on the type of tag used and the function to be performed. In general, a reader has radio circuitry to communicate with a tag, a microprocessor to check and decode the data and implement a protocol, a memory to store data and one or more antennae to receive the signal.

Unlike a barcode reader, which is limited to reading a single barcode at a time, a RFID reader may have more than one tag in its interrogation zone. The interrogation zone, as that term is used herein, refers to the area covered by the magnetic field generated by the reader's antenna. The process of reading a number of transponders within a system's interrogation zone is known as batch reading. Software applications known as anti-collision algorithms permit a reader to avoid data collision from several tags that enter the interrogation zone at the same time.

In one embodiment, the sort plan selected by the hub assist tool 46 is written to a hub assist label 50 in the form of a RFID tag. This information is then available to sorting operators or carrier hub facilities that are equipped with equipment to read the RFID tag. Thus, when the package arrives at the next sort location in the carrier network, the RFID tag is interrogated and sortation instructions are provided to the sorting operator. Preferably, the packages are received in single file or another suitable configuration such that an operator can readily identify a package associated with an interrogated tag. In this embodiment, the interrogation zone of the reader is narrowed to read one package at a time. Alternatively, the RFID tag may be equipped with a light that illuminates when read thereby identifying the associated package.

The method used to display a sortation instruction to a sorting operator can vary. In one embodiment, the sortation instruction is passed to another computing device in the hub that reads the sort plan and determines the next carrier facility to which the package should be sent. This computing device then turns on a light proximate a belt or sort location within the hub that identifies the target sort location for the package. Alternatively, the computing device may display the sortation instructions on a video monitor, heads-up display or other device viewable by a sort operator.

In a further embodiment, the sorting information is communicated audibly to a set of headphones worn by an operator. In this embodiment, the sorting instructions are processed by a text to voice synthesizer and sent to a speaker or a set of headphones. Alternatively, the synthesized instructions may be transmitted to a wireless headset via Bluetooth or FM transmission. As will be apparent to one of skill in the art, text to voice synthesizing software is readily available from software companies, such as Mircrosoft®, to translate electronic text into spoken words for the visually impaired. In operation, the sorting operator grasps a package, scans the label, and the sorting instruction, after conversion to voice, is broadcast to the operator via a speaker, FM signal, Bluetooth signal or the like.

Additional methods of communicating the sort instructions associated with a package will be readily apparent to one of ordinary skill in the art.

Virtual Hub Assist Label

In another embodiment, a hub assist label 50 takes the form of a virtual label. In this embodiment, the sort plan is stored in a database rather than on a physical label. When a package arrives at a sortation facility, the sort assist system 40 retrieves the sort plan from the database. Again, the package destination address and zip code can be captured from the package and used to query the database, or alternatively the package tracking number of other shipping indicia can be used. In this embodiment, the sortation instructions are displayed to the sorting operator via a virtual image that is projected on the package. In a preferred embodiment, a conventional heads up display system projects an image of the sorting instructions onto the package. Alternatively, the sorting instructions may be displayed on a video screen or a heads-up display that is worn by or readily viewable by the sorting operators. As will be obvious to one of ordinary skill in the art, many known systems and methods for displaying the sorting instructions to a sort operator can be used with the present invention.

Methods for Using a Hub Assist Label

FIG. 6 shows a process flow diagram that illustrates the steps of a sorting process in accordance with an embodiment of the present invention. The process begins when a package is submitted to a carrier for delivery to a destination address at step 100.

The destination zip code and service level are entered into the hub assist tool 46 at step 105. Preferably, the destination zip code and service level are captured electronically and sent to the hub assist tool 46 when the carrier first receives the package 42 and/or generates a shipping label 41. But if the package 42 is received with a pre-printed shipping label 41, the barcode on the shipping label may be scanned to capture a package identification number or tracking number. In such a case, the tracking number can be used to query a package detail database to capture the destination zip code and service level.

After identifying the destination zip code and service level, the hub assist tool 46 uses the zip code and service level to associate a sort plan to the package. At step 115, a hub assist label 50 is generated. For purposes of illustration we assume that a HAL is printed and attached to the package at this step. The label is preferably generated on a portable label printer carried by the user. This printer may receive the formatted label information from the hub assist tool 50 via any transmission method, such as for example, WIFI, Bluetooth, or convention cable. Of course, conventional fixed printers may also be used to generate a hub assist label 50.

At step 120, the package is sorted according to the sorting instructions from the hub assist label 50. In a preferred embodiment, at least a portion of the hub assist label 50 indicia is human readable and the operator reads the sort instructions and sorts accordingly. Preferably, the human readable indicia 52 are arranged in rows with each successive sort instruction listed in sequence from top to bottom. In an alternative embodiment, the hub assist label 50 includes a numerical code directly across from the sort locations to identify a specific conveyor belt, bin, or chute associated with the next sorting location. As will be obvious to one of ordinary skill in the art, the human readable sort instructions may be arranged in rows, columns, or diagonally as desired, as long as the operator can distinguish the sequence of sorting locations.

Alternatively, of course, the machine-readable indicia on the hub assist label 50 can be used at step 120 to provide sorting instructions to the sort operator. This may occur, for example, if the human-readable portion of the HAL is unreadable or the sorting operator may use the machine-readable indicia in lieu of the human-readable instructions. Preferably, the machine-readable indicia is in the form of a barcode, but other types of machine-readable symbology are known in the art can be used. If the machine-readable code is used, the sorting operator captures the machine-readable indicia 54 using a data capture device 44, and the data capture device 44 communicates the captured data to the hub assist tool 46, where the next sorting location is determined. The hub assist tool 46 then displays the correct sort location for the sort operator using one or more of the methods described above.

At step 125, the consolidated packages are transported to an appropriate sorting facility. At step 130, the sorting facility receives the packages and captures the sorting information from the hub assist label 50 for each package. At step 135, the sortation operator or the hub assist tool 46 determines from the captured information whether the current location is the destination facility for an associated package. The destination facility is preferably the last location in the sequence of locations listed on the hub assist label 50. If the current location is not the destination facility for an associated package, the package is sorted at step 120 according to the sortation instructions on the hub assist label 50. If the current location is the destination facility, the package is processed for delivery to or pickup by the consignee at step 140.

FIG. 7 illustrates the use of the HAL in a fully automated sortation system. Packages enter the sorting area via a conveyor belt 70. A data capture device 44 captures indicia from the hub assist label 50 on the package 42, and communicates the captured data to the hub assist tool 46. The hub assist tool 46 retrieves the sort plan and communicates the sorting instructions to an automated sorting controller 72. The sorting controller 72 actuates the sorting shuttle 74 to divert the package to the appropriate location. In this illustration, packages are diverted to one of chutes 76, 78 or to conveyor belt 80. As will be apparent to one of ordinary skill in the art, any automated sorting system may be used in connection with the present invention.

A benefit of the present invention is that the efficiency of the sorting process is no longer tied to the knowledge base of the operator, or the operator's ability to locate zip codes on a sorting table. The operator simply has to read the sorting instructions from the hub assist label 50 and sort the package accordingly.

The following paragraphs describe how a package carrier such as United Parcel Service, Inc. (UPS) may use the sort assist system to facilitate the delivery of a package. FIG. 8 illustrates a hub assist label 50 for a hypothetical package received at a service facility in Acworth, Ga. for delivery to Torrance, Calif. In this example, UPS generates the hub assist label 50 shown in FIG. 8 when the package is received at the Acworth facility. The label provides a sort plan in a human readable 52 and a machine readable 54 format. The package flow illustrated by this hypothetical hub assist label 50 calls for the package to proceed through sortation facilities in Acworth, Ga. (ACWTH), Pleasant Dale Road, Atlanta, Ga. (PLSDL), and Gardenia, Calif. (GRDNA). Within the UPS system, each sortation facility is identified by a five-digit abbreviation. Facility abbreviations are used on the hub assist label 50 because the employees are familiar with these identifiers.

On the hub assist label 50, the numerical code printed directly across from the each facility abbreviation provides the sorting instructions to a sorting operator. For example, the sorting operator in ACWTH (Acworth, Ga.) sorts the package to 0009. 0009 is a numerical code for the PLSDL facility (Pleasant Dale Road, Atlanta, Ga.).

The letters following the numerical codes represent a time frame for the sort at the particular sort location. For example, the "N" following the 0009 code designates the night sort at PLSDL. "D" represent day sort.

The barcode at the bottom of the label has the entire sort plan encoded therein. When a package is received at a hub, such as PLSDL (Pleasant Dale Road, Atlanta, Ga.), the label may be scanned by an automated sorting system or read by a sorting operator to capture the sorting instructions. The sorting operator no longer has to read the destination zip code from a shipping label and make an independent determination as to the sorting location based on memory or a sorting chart.

The 0050 code following GRDNA designation identifies the destination facility for this hypothetical package. Once the package arrives at the destination facility, sorting instructions are provided for the receiving operator at the top of the hub assist label 50. The instructions direct the operator to place the package on primary sort belt 100 then to an incompatibles area 100.

Other helpful indicia provided on this label include a package tracking number 57 and a date and time 58 when the package was received. Additionally, a package destination city and zip code 59 are also present on the label.

Methods for Altering a Sort Plan

A benefit of the present invention is that it facilitates dynamic sort plans. In some cases, circumstances may change while a package is in route through a carrier delivery system that necessitates a change in the sort plan associated with the package. In convention delivery networks, changing the sort plan creates sorting efficiency problems because the sorting process is tied to the knowledge-base of the sorting operators. A change in the sort plan requires that the sorting operator re-learn the sorting procedures. Thus, changes in the sort plan often result in increased opportunity for mistakes and a reduction in the throughput of the sort operation. By reducing the reliance on the memory of the sorting operator, the present invention allows a carrier to change its sort plans without negatively impacting the delivery process.

FIG. 9 shows a process flow that illustrates how a planned route for a package can be changed on the fly to respond to changed conditions. At step 200, the package is assigned a first sort plan. A change in condition occurs at step 205. As will be recognized by those skilled in the art, changes in condition can include, without limitation, traffic congestion, insufficient delivery vehicle capacity, insufficient sorting location capacity, road construction, and seasonal volume fluctuations. In response to a change in condition, and while the package is in route in the delivery network, the carrier changes the sort plan at step 210.

At step 215, the change in sort plan is implemented in the sort assist system 40. Preferably, the change in the sort plan is implemented by altering the sort plan database 48. The alteration may be a permanent or a temporary route change depending on the reason for the change. For example, seasonal changes to a sort plan are temporary changes while adding a new intermediate hub represents an example of a permanent change. For temporary changes, the alteration is preferably programmed to expire after a specified duration or on a specified date and the sort plan returned to its original state automatically.

At step 220, a package arrives at a carrier hub facility after a change in the carrier sort plan has occurred. At step 225, the hub assist label 50 on the package is scanned and the scanned information is forwarded to the hub assist tool 46. Preferably, the scanned information includes a sort plan, a destination zip code and a service level for the package. Alternatively, a shipping label associated with the package may be scanned to capture the destination zip code and service level.

At step 230, the hub assist tool 46 determines whether a change in the sort plan has occurred. Preferably, the hub assist tool 46 queries the sort plan database 48 using the captured destination zip code and service level to determine the next sortation facility for the package. This determination is compared against the sort instructions captured from the hub assist label 50. If a discrepancy is detected, a second hub assist label is generated with sort instructions based on the second sort plan at step 235. The package is then processed according to the new hub assist label.

Preferably, the second hub assist label is affixed on top of the first hub assist label 50. By affixing the second label on top of the first, the opportunity for confusion by the sorting operator is reduced. In an alternative embodiment, subsequent hub assist labels are distinguished from prior (and now obsolete) hub assist labels by crossing through and/or removing the prior label. Indicia such as a serial number or a different color can also be used to distinguish subsequent labels, and other methods of distinguishing subsequent HALs from an initial HAL will be readily apparent to one of ordinary skill.

In the case of an RFID-version of a HAL, the RFID tag is preferably a read-write tag and the new sortation information can be written over the initial sortation information. In such a system, sorting plan indicia at step 210 are captured using an RFID interrogator, and at step 225, the second sorting plan is written over the original sorting plan stored in the RFID tag.

As will be apparent to one of ordinary skill, a check of the sort plan against the information stored on the HAL can occur at every sortation facility in a carrier network as a matter of course. Alternatively, this check can occur only if a sort plan has been changed.

In still another alternative embodiment, the check of the HAL information against a sort plan occurs only at those sortation facilities affected by a change in a sort plan. In such an embodiment, the implementation of a change in the sort assist system 40 at step 215 includes generating an alert to sorting facilities affected by the sort plan change. Preferably, the alert specifies that packages bound for a specific sortation facility from the affected sort facility are now routed to an alternate facility. Packages received by an affected facility at step 220 are scanned at step 225 to obtain the sort plan from the hub assist label 50. The hub assist tool 46 queries the scanned sort plan for the alerted sorting instructions. If detected, a new hub assist label is generated at step 235 containing the revised sorting instructions. A benefit of this embodiment is that the unaffected sort facilities do not have to needlessly query each package for a sort change.

In a manual sort operation, a sort operator may perform the step of reading a hub assist label 50 to determine if the sort plan has changed rather than entering the hub assist label sort plan into the hub assist tool 46 at step 225. In this embodiment, when a new sort plan is implemented, an alert is broadcast to affected sortation facilities and provided to the sortation operators. Preferably, the alert specifies that packages bound for a specific sortation location are affected by a sorting change. The sortation operator reads the hub assist label 50 to determine if the associated package is bound for the identified sortation location. When an affected package is identified, the operator generates a new hub assist label. The operator then sorts the package according to the new hub assist label.

Turning to FIG. 10, the present invention also provides methods for detecting packages that are diverted from an initial sort plan. As will be obvious to those skilled in the art, a package may be purposefully diverted due to unexpected traffic congestion, road construction, or inadvertently diverted due to a sorting error. The sort assist system 40 in accordance with an embodiment of the present invention provides efficient methods for determining a new sort plan when a diversion is detected.

At step 300, a package is assigned a first sort plan, but the package is diverted from the first sort plan at step 305. At step 310, an intermediate sorting hub that is not part of the first sort plan receives the diverted package. The hub assist label 50 is scanned and the hub assist tool 46 recognizes that there are no sort instructions for the current sorting location at step 310. In response, the hub assist tool 46 generates a new sort plan (step 320). In a preferred embodiment, the system treats the intermediate sorting hub 20 as if it was the origin facility and determines the most direct sort plan from this location based on the destination zip code and service level of the package.

If a sorting operator reads the hub assist label 50 and detects that the HAL lacks an appropriate sorting instruction from the intermediate facility (step 310), or if the sorting operator questions the accuracy of a sorting instruction on a HAL, the sorting operator preferably has an option to generate a new hub assist label. In any case, if a new HAL is generated from an intermediate facility, the system automatically determines and assigns the most efficient sort plan to deliver a package to the destination facility. Moreover, if the system or an operator determines that an error caused the package to be diverted to the present location, an operator preferably has the option to change the service level of the package so that the package will reach the destination facility in the shortest time possible (or at least quicker than it would using the prior service level).

Pre-Load Assist Label

Another stage in the delivery process is the preload process. This stage involves capturing the destination address 30 and service level, and positioning the package in the appropriate location on the appropriate delivery vehicle for delivery to the destination address 30. As described below, this process is labor intensive and relies heavily on the knowledge-base of a preload operator. The preload operator must know which addresses are loaded into each vehicle.

In a package delivery system, the pre-load phase of the delivery process occurs when packages arrive at a carrier destination facility and are loaded to package cars for delivery to the consignee. Groups of individuals, known as preload operators (or pre-loaders), have the responsibility of receiving packages from a sortation bin or conveyor belt, examining the destination address on the package and loading the packages onto the package car that is responsible for delivering to that destination. In a typical destination facility, multiple package cars are loaded simultaneously and every one of the package cars has multiple load positions. As a result, to load a package, the pre-loader must first determine the correct package car for that package and then decide where on that package car to load the package.

These known pre-loading processes are largely manual processes that require that pre-loaders commit to memory the correct package car/load position combination for the many package destinations they encounter each day. Load charts are often placed at the pre-load site to aid the pre-loaders, but the package volume and time restraints of the process require that the pre-loader have an extensive knowledge base of load positions to function effectively.

The complexities associated with the pre-load process require that a pre-loader receive extensive training. A pre-loader is often asked to train for six or more weeks to familiarize him or herself with the various load positions they are required to memorize. In addition, because the pre-load process is critical to the timely delivery of packages, additional time must also be spent supervising the work of those fresh out of training. And, notwithstanding this extensive training, the nature of the process is such that errors in pre-loads still occur.

The reliance on the knowledge-base of the pre-loaders to perform the loading process results in other disadvantages as well. One problem is that carriers are unable to change the driver routes for fear of disrupting the pre-load process. The pre-load process relies so heavily on information that pre-loaders have committed to memory that any change to the dispatch plan that changes the loading order can cause major disruptions and errors in the loads. As a result, carriers are hesitant to change a dispatch plan or a route once the pre-loaders have memorized a set of load positions. And because the package car and load position assignments are dependent on the dispatch plan, the driver routes and other dispatch plan variables are rarely changed. Accordingly, drivers are forced to use routes that were developed years earlier, many of which are out of date and no longer efficiently serve a territory has changed in the intervening years.

FIG. 11 shows the various components of a delivery system 60 in accordance with an embodiment of the present invention. In this figure, a work allocation system 65 serves as the central component. The process begins when the work allocation system 65 receives a dispatch plan 70 and uses it to setup a pre-load process. Dispatch plans are well known in the art and can be produced by any number of well-known dispatching applications, among them: Roadnet 5000™, Territory Planner™ and Mobilecast™. For purposes of this invention, a dispatch plan can be viewed as simply a segregation of a geographical area or territory into one or more service provider routes (delivery routes), with each address on a delivery route assigned a service sequence. The systems and methods used to generate dispatch plans are known in the art and are outside the scope of this application. The present invention, instead, is directed generally to the use of a preexisting dispatch plan in a preload and the use of the systems and processes described below to generate and deliver a manifest of work to drivers.

Some of the components illustrated in FIG. 11 include a data capture system 75, a workload monitoring system 80 and a manifest download system 85. The function of each of these components is described in the following paragraphs.

At the start of a pre-load, the work allocation system 65 retrieves a dispatch plan 70 that will be used that day. The dispatch plan 70 is then forwarded to the work monitoring system 80 where a user is given the option of accepting the scheduled dispatch plan 70 or choosing another plan on which to base the pre-load.

As packages arrive in the pre-load site, the data capture system 75 uses a bar code, radio frequency identification (RFID) tag or other known data capture technology to capture the destination addresses and service levels of the packages. The package service level and destination address are passed to the work allocation system 65 where a match is made against the dispatch plan 70 to obtain a handling instruction for the package. As shown below, the handling instruction provides simple to follow instructions for the pre-loaders that indicate where the package should be loaded. The work allocation system 65 then passes the handling instruction information to the data capture system 75 where the information is sent to a printer or other label generation device and a pre-load assist label (PAL 90) is printed and affixed to the package.

FIG. 12 shows a PAL 90 and illustrates how the handling instructions on the PAL 90 instruct a pre-loader where to load the particular package. In the illustrated embodiment, the handling instructions on the PAL 90 comprise two 4-character identifiers separated by a hyphen. The first four characters are used to identify the route or package car, and the second four characters identify a load location on the package car. While a single package car is generally associated with one route, handling instructions can of course be generated that associate multiple routes with a single package car or multiple package cars with a single route.

In a preferred embodiment, the handling instruction provides a simple set of instructions that indicate to a pre-loader where to load the package. Preferably, the handling instructions identify the appropriate package car and the proper load position on the package car for that package. When properly implemented, the generation and use of the handling instructions eliminates the need for the pre-loader to commit load positions to memory. As a result, the pre-loader task is greatly simplified, which in turn offers the carrier or other delivery company greater flexibility in modifying a dispatch plan without risking a disruption to the pre-load process.

With reference again to FIG. 12, the handling instructions on this particular PAL 90 instruct a pre-loader to load the package in position 5889 of route R021. With these handling instructions as a guide, the pre-loader identifies which of the three package cars is assigned to route R021 and places the package on the shelf that is associated with load positions 5000 through 5999. In a preferred embodiment, the load positions assigned to each package car are the same for all package cars. Alternatively, a service provider and/or pre-loader might customize the load position of a package car so that the load position reflected on the PAL 90 identifies load positions on a unique package car or on a unique type of package car.

The PAL 90 can include other package data that is relevant to the sortation and pre-load process. In this example, the PAL 90 includes fields for primary and secondary package sortation information, an irregular drop-off identifier, a DCAP station, a low to high indicator, a commit time, a destination address/consignee name, and a package tracking number. A primary sort identifier identifies the primary sort belt that moves the package through the carrier facility and the secondary sort identifier identifies the secondary belt that moves the package from the primary belt to the belt or bin from which the package is retrieved by the pre-loaders. An irregular drop-off identifier identifies the location in the building where the package will be placed if it is too large, too heavy or shaped such that it cannot be placed on a sorting belt. In general, packages bearing an irregular drop-off identifier are sorted manually.

The DCAP field of the PAL 90 associates the package to a particular data capture workstation in the data capture system 75. The low to high indicator indicates the order in which the package car should be loaded in the package car. In a preferred embodiment, if the low to high indicator is set, packages are loaded sequentially from the lowest number in the street range (i.e. 1 Main Street) to the highest number in the street range (i.e. 10 Main Street). If the low to high indicator is not set, the packages are loaded from the highest number (10 Main Street)

As will be apparent to one of skill in the art, the method used to communicate the handling instructions to a preload operator can vary. These methods include, without limitation, displaying on monitor, communicating via a heads up display or via the transmission of an audio signal.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

That which is claimed:

1. A method for sorting a package using a hub assist label wherein the package is to be delivered to a destination address, the method comprising the steps of:

providing a hub assist label associated with a package, said hub assist label having indicia comprising a sequential list of a plurality of sorting locations that the package will pass through before reaching a destination address;

capturing said indicia from said hub assist label;

projecting one of said sorting locations onto said package; and sorting said package based at least in part on said one of said plurality of sorting locations.

2. The method of sorting of claim 1, wherein said step of capturing indicia is automatic and said package is diverted automatically based at least in part on said captured indicia.

3. The method of sorting of claim 1, further comprising the step of displaying said sorting instructions on a monitor.

4. The method of sorting of claim 1, further comprising the step of synthesizing said one of said sorting locations to an audio signal and broadcasting said audio signal.

5. The method of sorting in claim 1, further comprising the step of illuminating a light associated with said one of said sorting locations.

6. A method for sorting a package comprising the steps of:

capturing a destination address from a package;

determining a sequence of delivery network facilities that the package will pass through en route to the destination address;

generating a label having indicia comprising a list of the delivery network facilities according to said determined sequence;

capturing the indicia from the label;

providing a heads up display system and projecting, onto said package using said heads up display, a sorting location associated with one of said delivery network facilities; and sorting the package based at least in part on the projected sorting location.

* * * * *